US006358587B1

(12) United States Patent
Saint et al.

(10) Patent No.: US 6,358,587 B1
(45) Date of Patent: Mar. 19, 2002

(54) MULTIPLE MATERIAL PRINTABLE SHEET WITH INSET

(75) Inventors: Andre Saint, Tonawanda; Omar S. Attia, Lakeview, both of NY (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/267,931

(22) Filed: Mar. 11, 1999

(51) Int. Cl.[7] ................................................ B32B 33/00

(52) U.S. Cl. ........................ 428/40.1; 283/81; 283/101; 428/41.3; 428/41.9; 428/42.2; 428/43; 428/194; 428/213

(58) Field of Search ............................... 428/40.1, 41.3, 428/41.9, 42.1, 42.2, 43, 194, 213; 283/81, 101

(56) References Cited

U.S. PATENT DOCUMENTS

| | | | |
|---|---|---|---|
| 5,219,183 | A | 6/1993 | McKillip |
| 5,403,236 | A | 4/1995 | Greig |
| 5,413,830 | A | 5/1995 | Edwards |

*Primary Examiner*—Nasser Ahmad
(74) *Attorney, Agent, or Firm*—Oppenheimer Wolff & Donnelly LLP

(57) ABSTRACT

A carrier assembly includes a face sheet on the top and a base sheet on the bottom, respectively. The face sheet has an opening, and substantially filling the opening is an insert. Between the first sheet and the base sheet is a first discontinuous adhesive pattern bonding the face sheet to the base sheet, and between the insert and the base sheet is a second discontinuous adhesive pattern releaseably bonding the insert to the base sheet. The carrier assembly reliably passes through a high speed printer or copier for variable printing, and a user may remove the insert from the accompanying carrier for later use.

24 Claims, 6 Drawing Sheets

MULTIPLE MATERIAL PRINTABLE SHEET WITH INSET

BACKGROUND OF THE INVENTION

1. Field of the Invention

This invention relates generally to a carrier assembly with a removable insert therein which will reliably pass through a high speed printer or copier for variable printing and, more particularly, to a carrier assembly which substantially simulates the qualities of a paper and remain substantially flat.

2. Description of the Related Art

Virtually everyone in today's society has at least one identification (ID) card in some form or another. These ID cards are mailed out by businesses to their customers with essential data imprinted on them so that each customer may be identified when calling to conduct business. Increasingly, ID cards are mailed out attached to an accompanying form sheet with the customer's address and the instructions on how to use the ID card, thereby eliminating the possibility of mailing the wrong ID card to customers. Other products, such as automobile license plate labels, are also sent to the user, mounted on carrier sheets. Printing is generally done by printers and copiers or the like, which are connected to a computer to print each form with information pertaining to a customer. Also, with the advancement of high speed printers and copiers, large quantities of forms may be printed in a short time. For example, today's high speed printers may make 80 to 180 copies per minute, and such printers are commonly used in the insurance industry to make ID cards for customers.

There are several patents which disclose ID cards attached to a form for printing by a printer or the like. However, these references do not disclose a form with an insert such as an ID card attached thereto which can reliably pass through a high speed printer. For example, U.S. Pat. No. 5,413,830 issued to Edwards, discloses a sheet with an indentation pressed into the front surface of the sheet, and a card is adhesively applied within the indentation. One of the problems here is that the sheets do not have constant thickness due to the indentation, and as the sheets pass through a high speed printer, the printers periodically jam. In this regard, high speed printers are designed to handle papers with uniform mechanical properties, and any significant departure from uniformity will cause occasional malfunctions, with resultant down-time of the printing process.

In an effort to solve the problem of jamming, there are several patents which disclose a form with constant thickness, such as U.S. Pat. No. 5,219,183 issued to McKillip, and U.S. Pat. No. 5,403,236 issued to Greig. Both references disclose a form comprising a face sheet which is fixed to a base or backing sheet by an intermediate layer of adhesive fully coated between the two sheets. The face sheet has a cutout to receive a card within the cutout, and which is removed after printing. However, one problem with the forms made according to the above construction is that they tend to curl over time. Curling is predominately caused by the form sheets absorbing moisture from the atmosphere. For example, if the face sheet absorbs more moisture than the base sheet, then the face sheet will have greater tendency to curl, and the base sheet will follow since they are both fixed to one another, and a similar result occurs if the base sheet absorbs more moisture.

With today's high speed printers and copiers, however, curling of the form sheets can present a number of problems because these machines are designed for printing on flat papers. For example, most printers and copiers have either a vacuum or friction mechanism to feed the papers from the feeding tray. With a vacuum feeding mechanism, paper sheets are basically sucked up against a belt then fed into the printing unit. However, any unevenness or curl on the sheet creates a leak so that an incomplete vacuum is created against the belt, and may cause the belt to improperly feed the paper into the printing unit or, worse yet, jamming it. With a friction feed mechanism, rollers are used to grab the paper and feed it into the printing unit. However, if there is unevenness or curl on the paper, then the rollers are unable to make continuous contact with the paper for proper feeding, thus causing the paper to again feed at an angle or occasionally jamming the printing unit, forcing shut-down of the printing process.

Therefore, there is still a need for a carrier of inserts such as ID cards which can reliably pass through a high speed printer or copier. These and other objects, features and advantages will become apparent from consideration of the following detailed description and from the accompanying drawings.

OBJECT AND SUMMARY OF THE INVENTION

A general object of the present invention is to provide a carrier which can carry an insert, such as an ID card, reliably through a high speed printer or copier, to make large quantities of personalized inserts which may be later removed from the accompanying carrier.

In accordance with one aspect of the present invention, these and other objectives are accomplished by providing a carrier that substantially simulates the qualities of a document paper, such as: constant thickness, flexibility, and lay-flat properties. An exemplary assembly, in accordance with the present invention, having the above qualities includes: a base sheet; a face sheet having a predetermined thickness, the face sheet having a window opening; an insert of a different material from the face sheet, the insert having a thickness substantially equal to the predetermined thickness of the face sheet, and substantially filling the window opening of the face sheet; a first layer of adhesive having a plurality of adhesive areas and a plurality of non-adhesive areas, the first layer of adhesive discontinuously securing the face sheet to the base sheet, wherein the face sheet and the base sheet are mechanically de-coupled to a substantial extent by the plurality of non-adhesive areas to enhance lay-flat properties; a second different adhesive releasably securing the insert to the base sheet; and the multilayer sheet assembly having substantially coplanar surfaces and being sufficiently flexible to reliably pass through a high speed printer or copier.

Constant thickness is achieved in the above exemplary carrier by providing the insert (such as an ID card) with substantially the same thickness as the face stock sheet, and providing the first and second adhesive layers which are also substantially the same in thickness. Therefore, the assembly of the face and base sheets has substantially coplanar surfaces. Furthermore, the exemplary carrier is flexible because the first layer of adhesive bonds the face sheet to the base sheet discontinuously, i.e., some areas are not bonded, which allows the two sheets to breathe and work independently in this area to improve the flexibility of the exemplary carrier. "Breathing" between the two sheets also allows any moisture absorbed by one sheet to be absorbed by the other sheet, thereby minimizing the curling of one sheet over another. Thus, the exemplary carrier stays substantially flat. At the same time, in the areas where the two sheets are bonded, the two sheets work together and provide structure to further resist curling.

As one advantage to the use of two different materials, the insert may be made of more expensive material than the remainder of the face stock sheet, thus reducing costs.

Although the present invention has been described in terms of the preferred embodiment above, numerous modifications and/or additions to the above-described preferred embodiments would be readily apparent to one skilled in the art, which are to be interpreted in accordance with the principles of patent law, including the Doctrine of Equivalents.

BRIEF DESCRIPTION OF THE DRAWINGS

A detailed description of the preferred embodiment of the invention will be made with reference to the accompanying drawings.

DETAILED DESCRIPTION OF THE PREFERRED EMBODIMENTS

The following is a detailed description of the best presently known modes of carrying out the invention. This description is not to be taken in a limiting sense, but is made merely for the purpose of illustrating the general principles of the invention.

Figure 1:
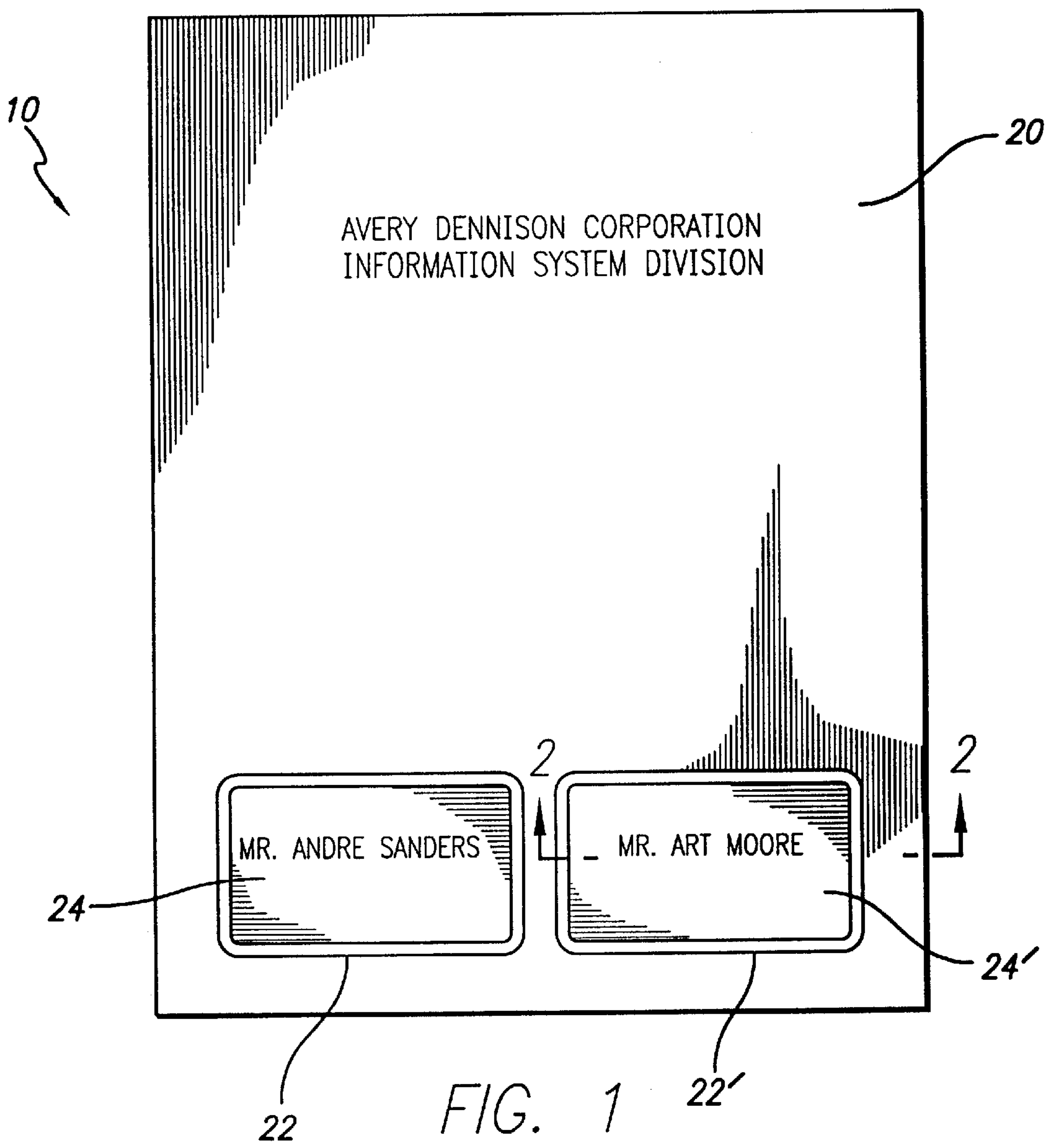
FIG. 1 is a top view of an exemplary embodiment of a carrier assembly with two inserts illustrating the principles of the present invention.
Figure 2:
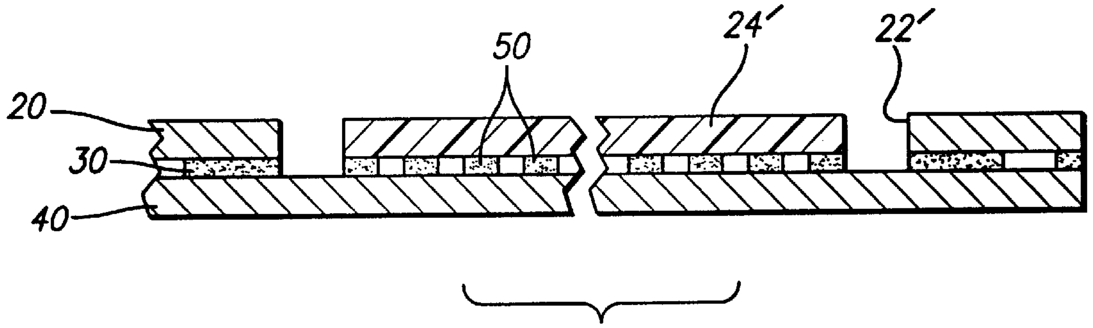
FIG. 2 is a cross-sectional view of the exemplary carrier assembly taken along line 2—2 of FIG. 1.
Figure 3:
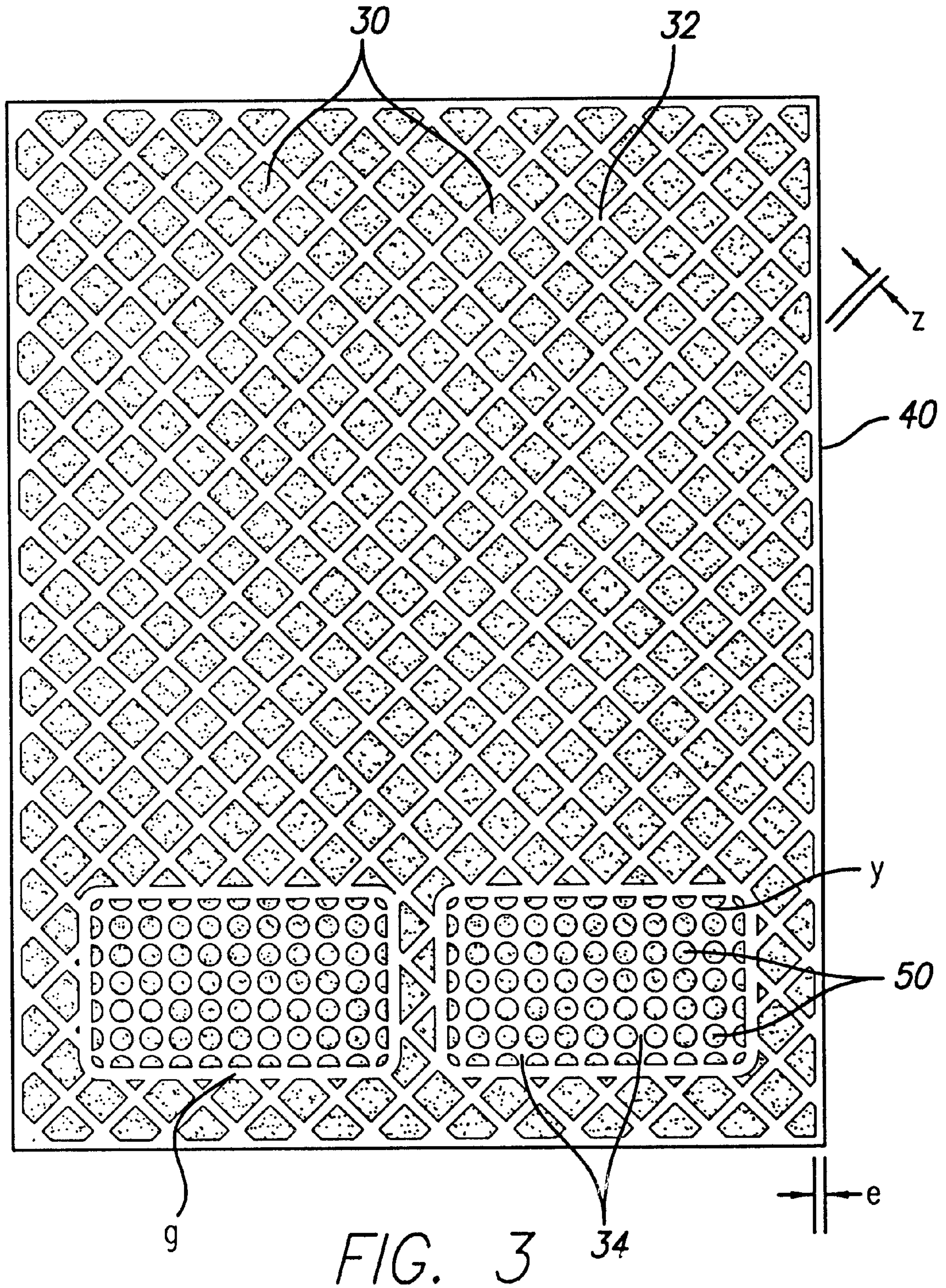
FIG. 3 is a top view of an exemplary intermediate layer of discontinuous adhesive of the exemplary carrier assembly.

As shown by way of example in FIGS. 1–3, a carrier assembly 10 in accordance with one embodiment of the present invention as constructed can carry at least one insert, such as an ID card, and pass reliably through a high speed printer or copier, to make large quantities of personalized ID cards. After the printing, the insert may be later removed from the accompanying carrier. In this regard, the carrier assembly 10 includes a face sheet 20 on the top and a base or backing sheet 40 on the bottom, respectively. As illustrated by way of example in FIG. 1, the face sheet 20 has two openings 22 and 22', and substantially filling the openings 22 and 22' are inserts 24 and 24', respectively. Furthermore, as shown more clearly in FIG. 3, a first exemplary discontinuous adhesive pattern 30 bonds the face sheet 20 to the base sheet 40, and a second exemplary discontinuous adhesive pattern 50 releaseably bonds the inserts 24 and 24' to the base sheet 40.

As illustrated by way of example in FIG. 1, the face sheet 20 has a first thickness, and the inserts 24 and 24' preferably have substantially same thickness as the face sheet 20. Thus, after the inserts 24 and 24' are deposited into the openings 22 and 22, they are flush with the top surface of the face sheet 20. This allows the print roller within the printer to effectively print on the inserts 24 and 24'. In other words, if the inserts were too recessed within the opening, then the rollers could not effectively print on the inserts. Accordingly, the carrier assembly 10 has substantially coplanar surfaces (constant thickness). The configuration of the opening 22 may be different than in size and shape with the opening 22'. Preferably, however, the openings 22 and 22' are rectangular with the size similar to that of a business card, credit cards, or personalized ID cards, as illustrated by way of example in FIG. 1. The configuration of the inserts 24 and 24' are slightly smaller than the configuration of the openings 22 and 22', so that the inserts substantially fill the openings but leaving a small gap between the inserts and the face sheet 20. Preferably, the small gap around the insert is continuous with gap having a distance in the range of approximately 0.03 to 0.07 inches.

The material used for the face sheet 20 may be of variety of printable sheet material, preferably paper. The inserts 24 and 24' may be made of variety of materials, such as plastic, cardstock, paper-plastic laminated, or other synthetic material to enhance the durability of the inserts. However, inserts are preferably made of different materials than the face sheet 20, so that the inserts may be made of more expensive material than the remainder of the face sheet to lower overall cost of the assembly. Additionally, both the face sheet 20 and the inserts 24 and 24' are preferably made of material sufficiently flexible to reliably pass through the complex paths within the copier or printer. Also, a carrier 10 having two inserts 24 and 24' is generally preferred to provide two cards for two people, however, it is within the scope of this invention to provide the carrier 10 with one insert or more than two inserts. Additionally, the carrier 10 may be provided in a single sheet form, as shown in FIG. 1, or in a continuous carrier form for applications involving printers and copiers which can accept continuous forms.

The base or backing sheet 40 may also made of wide variety of paper products such as very inexpensive thin paper stock, and may be the same material as the face sheet 20. However, the base sheet 40 is a continuous sheet without an opening.

As illustrated by way of example in FIG. 3, adhesives are placed in a plurality of predetermined areas 30 to bond the face sheet 20 to the base sheet 40. Conversely, the areas free of adhesive are defined as zone areas 32. A combination of the adhesive areas 30 and zone areas 32 form a discontinuous adhesive layer to bond the face sheet 20 to the base sheet 40. One of the advantages with the discontinuous adhesive layer is that the flexibility of the carrier assembly 10 is improved because the face and base sheets work independently in the zone areas 32. Consequently, the carrier 10 is flexible in the zone areas 30. Furthermore, the face sheet 20 and the base sheet 40 are able to breath in the zone areas 30, so that any moisture absorbed by one sheet may be absorbed by the other sheet or more freely able to evaporate, which minimizes the curling. As a result, the carrier 10 stays substantially flat. At the same time, in the predetermined areas 30 where the face and base sheets are bonded, the two sheets work together and provide a structure to further resist the curling of the carrier assembly 10. In other words, the two sheets with the intermediate layer of discontinuous adhesive layer form a structure similar to that of a honeycomb structure, which is flexible to reliably pass through a high speed printer, yet providing strength and breathability to resist curling generally caused by absorption of moisture in the air.

As illustrated by of example in FIG. 3, one of the exemplary patterns for the predetermined areas 30 is a plurality of square blocks which are spaced apart by a distance "Z". Here, the distance "Z" defines the width of the nonadhesive areas of the zone areas 32. Preferably, the square blocks have a surface area in the range of approximately 0.125 to 1.00 square inch, and the space "Z" is in the range of approximately 0.06 to 0.25 inch, with a preferred distance of 0.125 inch. Although FIG. 3 shows the predetermined areas 30 as isolated islands separated by the zone areas 32, the predetermined areas 30 may be connected to one another by thin adhesive channels (not shown). The thickness of the thin adhesive channels may be in the range of approximately 0.06 to 0.25 inches. Furthermore, the zone areas 32 may be a plurality of isolated islands of nonadhesive areas, in the range of approximately 0.06 to 0.50 inch.

Figure 4:
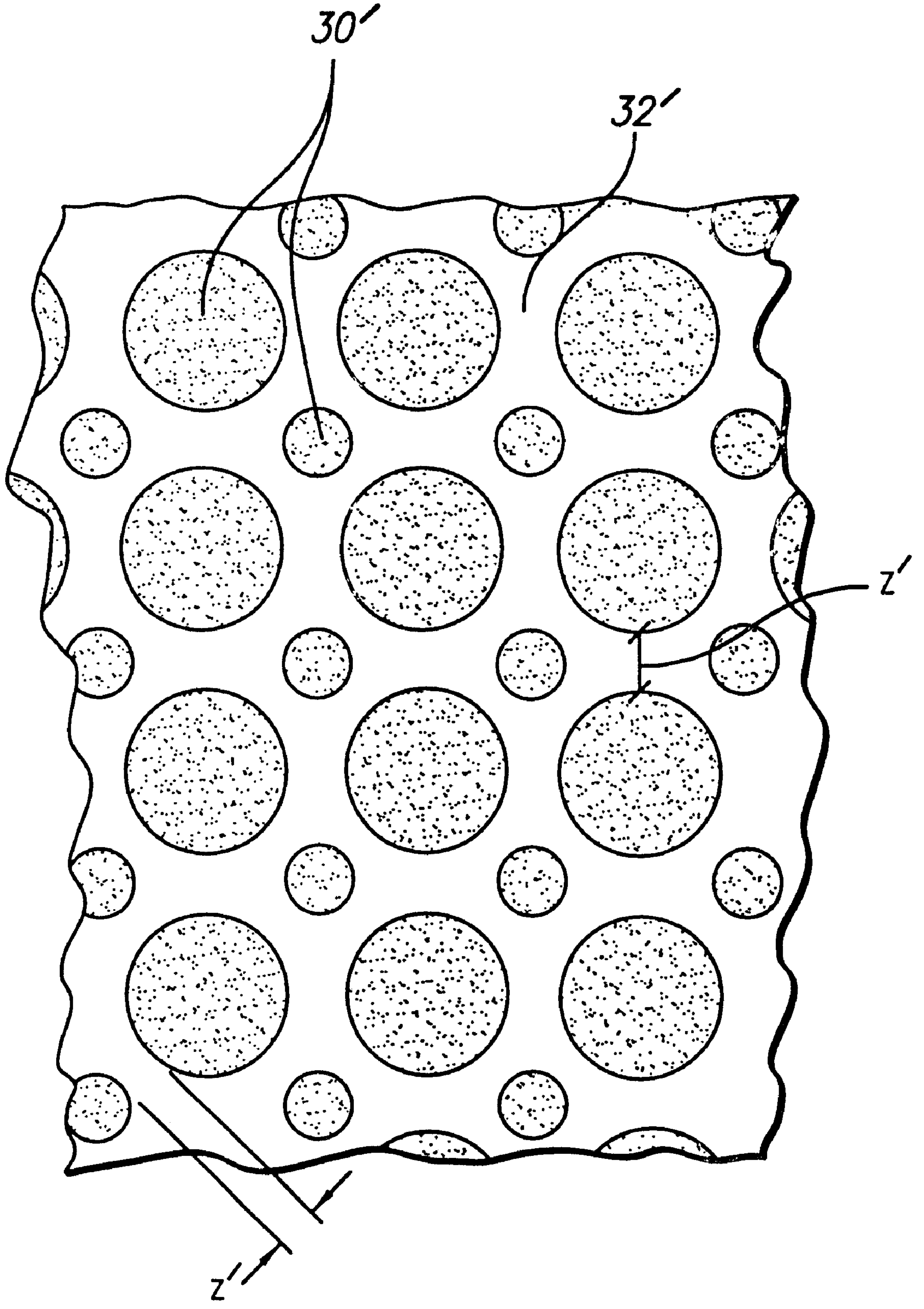
FIG. 4 is a top view of another alternative embodiment of the intermediate layer of discontinuous adhesive.

Another exemplary pattern is illustrated by way of example in FIG. 4, here, the predetermined areas 30' (prime "'" is used to distinguish the differences in the shape of the adhesive areas) include a combination of first predetermined circular areas and second circular areas. The second circular areas are smaller than the first predetermined circular areas, which are intermixed between the first circular areas. Here, each of the first and second circular areas are spaced apart by a variable distance "Z'". In other words, in this exemplary pattern, the distance "Z'" represents some preferred distance amongst the adhesive circular areas. Preferably, the first circular areas have an adhesive area in the range of approximately 0.125 to 1.00 square inch, the second circular areas have an adhesive area in the range of approximately 0.08 to 0.13 square inches, and the distance "Z'" is in the range of approximately 0.06 to 0.25 inch.

Figure 5:
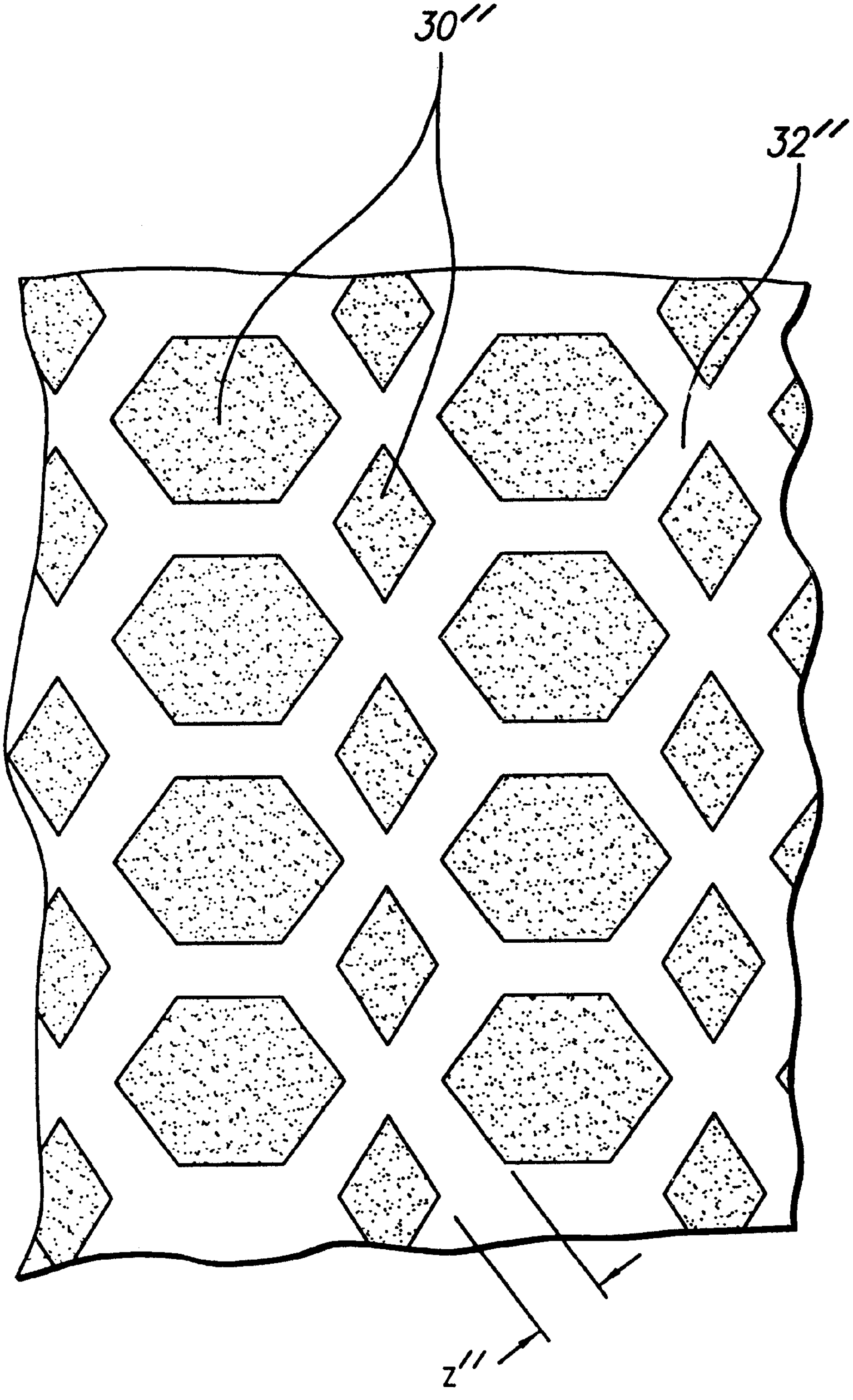
FIG. 5 is top view of yet another alternative embodiment of the intermediate layer of discontinuous adhesive.

Yet another exemplary pattern is illustrated by way of example in FIG. 5, here, the predetermined areas 30" (prime """ is used to distinguish the differences in the shape of the adhesive areas) include a combination of plurality of hexagon and diamond shaped adhesive areas. Here, each of the hexagon and diamond shaped adhesive areas are spaced apart by a variable distance "Z"". In other words, the distance "Z"" represents some preferred distance amongst the adhesive areas. Preferably, the hexagon shaped areas have an adhesive area in the range of approximately 0.125 to 1.00 square inch, the diamond shaped areas have an adhesive area in the range of 0.08 to 0.13 square inch. The distance "Z"" is in the range of approximately 0.06 to 0.15 inch, with preferred distance in the range of 0.125 inch.

It should be noted, that the predetermined adhesive areas 30 are not limited to the patterns described above, it is within the scope of the present invention to have adhesive areas placed randomly and irregularly shaped.

Also, as shown in FIG. 3, the perimeter of the discontinuous adhesive layer 30 is preferably within a distance "e" from the edges of the face sheet 20 and the base sheet 40, to prevent the adhesive between the face sheet 20 and the base sheet 40 from "oozing" out. The "oozing" is caused by the high temperature within the laser printer which can melt or soften the adhesive, and the pressure applied to the sheets as it passes through the printer tends to squeeze or "ooze" the adhesives out. This can cause number of problems, such as sticky edges on the sheets, and damaging the printer due to the adhesive materials adhering to the moving parts of the printer. However, having the distance "e", free of adhesive along the edges of the carrier sheet 10 prevents the adhesive from "oozing" out over the edges of the carrier sheet 10.

An adhesive material used in the predetermined areas 30 preferably forms substantially permanent bond between the face and base sheets. A general purpose hot melt adhesive, and other suitable alternative adhesive well known to those skilled in the art are acceptable. Preferably, rubber based adhesive is used to bond the two sheets together.

As illustrated by way of example in FIG. 3, a plurality of second adhesive are placed in the predetermined areas 50 to bond the inserts 24 and 24' to the base sheet 40. Conversely, the areas free of adhesive amongst the predetermined areas 50 is defined as zone areas 34. An exemplary predetermined areas 50 may be defined by a plurality of circles, which are spaced apart by some distance "Y". Preferably, the circles have a surface area in the range of approximately 0.05 to 0.10 square inches, and the distance "Y" is in the range of approximately 0.06 to 0.25 inches. It should be noted, however, that the predetermined areas may be configuration of variety of shapes, such as: a square, hexagon, and diamond, or parallel lines. Preferably, there is a continuous gap "g" between the adhesives in the predetermined areas 30 and 50, where the gap "g" is the range of approximately 0.12 to 0.25 inches.

Adhesive used in the predetermined areas 50 preferably has sufficient tack to properly hold the inserts in place within the opening of the carrier to prevent unintentional removal of the inserts. In other words, the adhesive should be aggressive enough to hold the inserts in place during transportation, storage, and especially during printing as the carrier is passing through a high speed printer or copier, which can print more than 50 and up to 80 to 180 or more sheets per minute. At the same time, the adhesive preferably has sufficient sensitivity to release the insert when a user intentionally peels away the insert from the carrier, without tearing the base sheet. Furthermore, after the inserts are peeled, no significant adhesive residue should remain on the inserts. The adhesive should also have good aging characteristics so that the commercial product of the carrier may be stored for long periods of time. Preferably, the "peel force" necessary to remove the insert from the carrier is in the range of approximately 5 to 75 grams per square inch. In this regard, as one ordinarily skilled in the art would understand, the "peel force" as defined above may be measured through the Instron tensile test unit.

Figure 6:
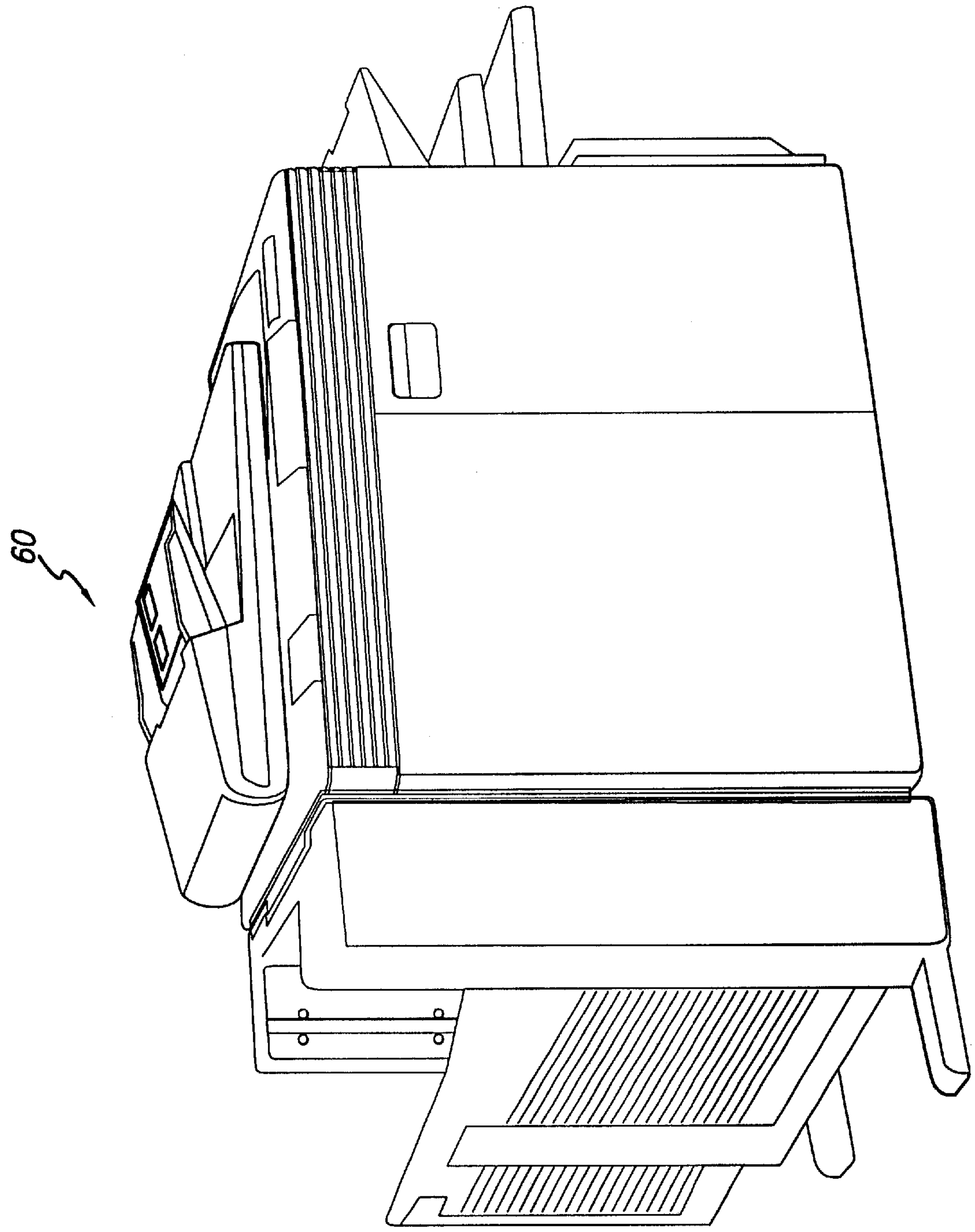
FIG. 6 is a perspective view of an exemplary high speed printer.

Additionally, the adhesives for the predetermined areas 30 and 50 preferably have high melting or softening point so that the adhesives do not become undone due to the heat generated within the printer. For example, the printers such as the one shown in FIG. 6 typically employ rollers to advance printing stock therethrough. The temperature of these rollers and other heated elements within the printer 60 is typically in the range of about 375° Fahrenheit to 450° Fahrenheit. However, the effective temperature of the rollers relative to sheet material fed through them is estimated to be in the range of 175° Fahrenheit to 300° Fahrenheit. Therefore, the heat absorbed by the adhesives for the predetermined areas of 30 and 50 should not melt or soften as the carrier passes through the high speed copiers or printers, which can print upto 180 sheets per minute. It should be noted, however, because the carriers are generally passing through the printers and copiers at such high rate of speeds, even adhesives with softening points below the effective temperature of the rollers will not generally absorb enough heat to soften.

An exemplary adhesive in the predetermined areas 50 may be a latex based pressure sensitive adhesive, which is a blend of synthetic and natural latex having aggressive tack. Another exemplary adhesive may be a mailing type adhesive designed to temporary hold credit cards to paper. Yet another exemplary adhesive may be a rubber based removable hot-melt with aggressive tack characteristics. It should be noted that the above exemplary adhesives are not intended as a complete list of adhesives which may be employed in the predetermined areas 50, instead it is only intended as a family of adhesives exhibiting the preferred characteristic as discussed above. Therefore, other suitable adhesives known to those skilled in the art may also be used.

Preferably the thickness of the adhesives in the predetermined areas 30 and 50 are substantially same so that the carrier assembly 10 has substantially coplanar surfaces to reliably pass through the printer. Still further, the overall thickness of the carrier assembly structure 10 must be on the order which a printer, such as the printer 60, can handle without jamming or malfunctioning. This operating thickness range for most laser printers and copiers is approximately 2 mils to 15 mils. Therefore, the thickness of the carrier assembly structure should also be in this approximate operating thickness range. Generally speaking, the adhesive for the predetermined areas 30 and 50 are applied with the adhesive patterns as discussed above with a thickness in the range of approximately ½ mil to 1 mil onto the base sheet 40. The thickness of the face sheet is in the range of approximately 1½ mils to 9 mils. The thickness of the base sheet is in the range approximately 1½ mils to 6 mils. Accordingly, the combined assembly of the carrier 10 may be in the range of approximately 3½ mils to 16 mils, depending on the application. For a specific applications such as credit cards with a insert thickness in the range of approximately 6 to 9 mils, the overall thickness of the carrier sheet assembly 10 is within the range of approximately 8 mils to 16 mils, with a preferred range of approximately 10 mils to 13 mils.

Also, as discussed above, the carrier assembly 10 may be a single sheet or a continuous sheet, depending on the application. In single sheets, the carrier sheet 10 preferably comes in dimensions of: 8½ inches by 11 inches, 8.27 inches by 11.69 inches (A4), 8½ inches by 14 inches (legal), and so on.

Figure 7:
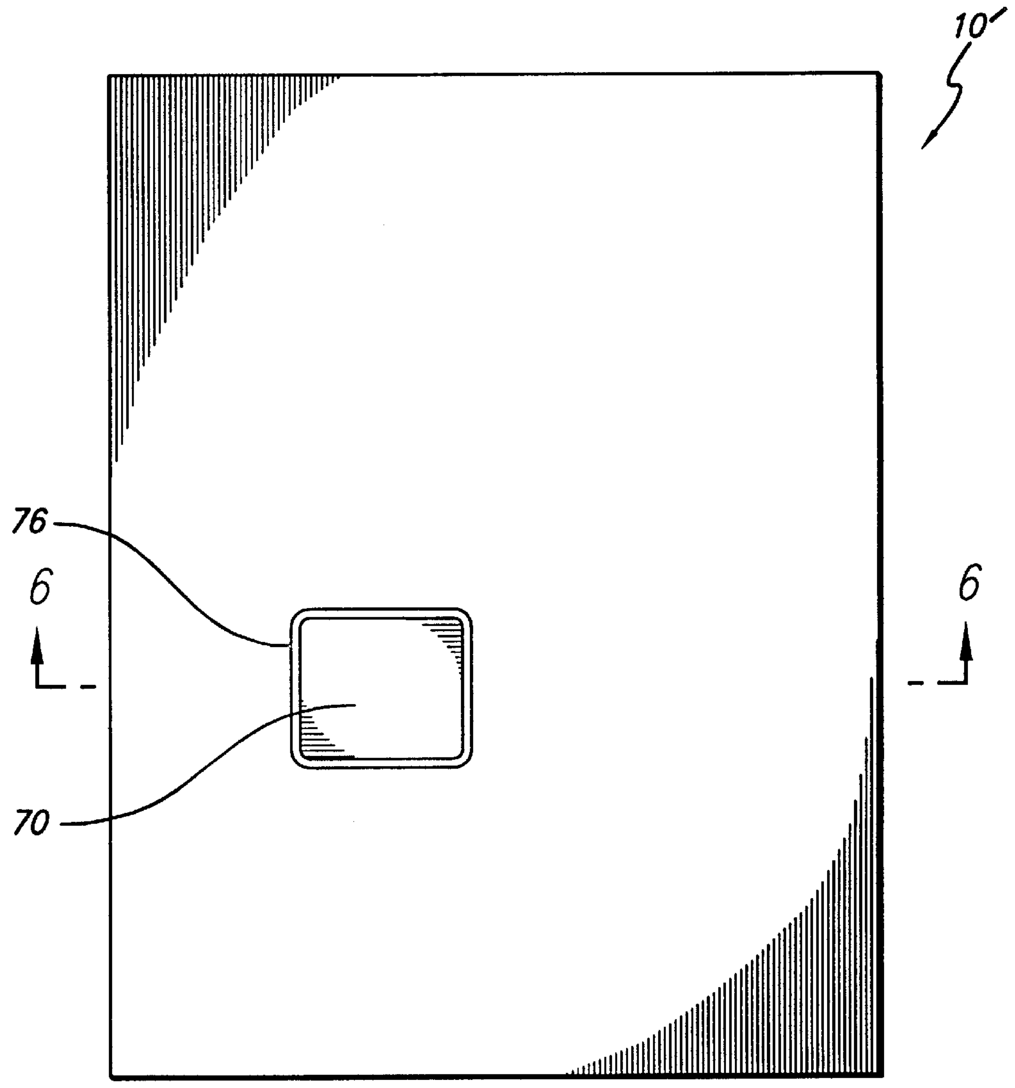
FIG. 7 is a top view of another exemplary embodiment of a carrier assembly with one insert in accordance with the present invention.
Figure 8:
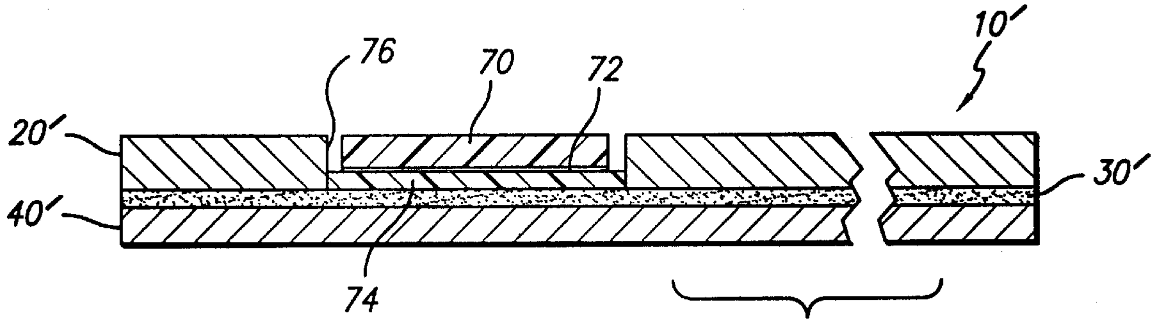
FIG. 8 is a cross-sectional view of the exemplary carrier assembly taken along line 6—6 of FIG. 7.

With reference to FIGS. 7 and 8, another exemplary embodiment of a carrier assembly 10' in accordance with the present invention is shown. In FIGS. 7 and 8, all of the components comparable to those in FIGS. 1–3 are shown by the same reference numerals only followed by a “'”. In this embodiment, the carrier assembly 10' include a face sheet 20' which is bonded to a base sheet 40' by an intermediate discontinuous adhesive pattern layer 30', as discussed above. However, one of the differences in this embodiment is that the entire surface of the base sheet 40' is covered with the intermediate discontinuous adhesive pattern layer 30', i.e., the adhesive pattern layer 30' now also covers the window opening area 76. Alternatively, the adhesive pattern layer within the window opening area may be continuous, i.e., adhesive coating without the adhesive free areas or the zone. Yet another alternative is to have the window opening area 76, free of adhesives.

Furthermore, as shown more clearly in FIG. 8, an insert 70 is provide with an adhesive 72 coated on the side facing the carrier 10, unlike the inserts 24 and 24' which are free of adhesive. In other words, the insert 76 in this embodiment is a pressure sensitive adhesive (PSA) label.

The configuration of the insert 70 is slightly smaller than the configuration of the opening 76, so that the insert 76 substantially fills the opening 76 and leaves a small gap surrounding the insert 70. Also, the insert 70 preferably has substantially the same thickness as the face sheet 20', so that the insert 70 can be deposited into the opening 76 being flushed with the top surface of the face sheet 20', thereby providing coplanar surfaces (constant thickness) to the carrier assembly 10'. However, if the window opening area 76 is free of adhesives (not shown in the Figures), then the insert 70 is preferably thicker than the face sheet 20' so that the insert 76 is substantially flushed with the top surface of the face sheet 20', after the insert 76 has been deposited into the window opening 76.

As illustrated by way of example in FIG. 8, a thin layer of release agent 74 is preferably applied in the area of the opening 76 over the discontinuous adhesive pattern 30' to facilitate clean removal of the insert 70 from the carrier 10'. In other words, the release agent 74 reduces the degree of adhesion between the insert 70 (PSA label) and the adhesive pattern layer 30' so when a user intentionally removes the insert 70, it may be readily peeled off of the carrier 10' cleanly. However, the adhesion between the insert 70 and the release agent 74 should be aggressive enough to avoid any unintentional removal of the insert 70 from the opening 76. Preferably, silicon material is used as the release agent 74. Alternatively, if the area within the window 76 is free of adhesive, then the release agent 74 may be applied over the base sheet 40'.

Above embodiments may be used for variety of applications, for example, one particular application may be for use in mailing out yearly automobile decals from the Department of Motor Vehicles (DMV). In this regard, the insert 70 may be a film made by American Decal Company located at 4100 West Fullerton Ave., Chicago, Ill. 60639 (a supplier of films meeting the government specification for the DMV decals). The film is generally supplied in a roll one decal wide. A plurality of carriers 10' with a film deposited into the opening 76 may be manufactured by unwinding the roll and tipping a film cut to size of the desired decal into the opening 76. Thereafter, a high speed printer may be used to print on the carrier 10' and the insert 70. For example, drivers name, address, and license number may be printed on the face sheet 20', and the tag number on the insert 70 (decal film). Since the printer is printing on the carrier 10' and the insert 70, on one assembly, any mistake of sending the decal to the wrong driver is eliminated.

The present invention may also be used by the insurance providers, medical providers, or in any applications where a form is sent out with a detachable insert(s). For example, an insurance company may place a stack of carriers into a storage tray of the high speed printer, and print thousands of personalized forms for each of their customers. Thereafter, the forms are mailed out to their customers, and after reading the instruction on the face of the carrier, they may remove the insert (ID card) from the accompanying carrier, so that they may identify themselves to the insurance company in later communications.

The present invention provides quick and easy way of printing literally thousands of forms by providing a carrier that substantially simulates the qualities of a paper, i.e., coplanar surfaces, flexibility, and lay-flatness, so that it may reliably pass through a high speed printer or copier.

In closing, it is noted that specific illustrative embodiments of the invention have been disclosed hereinabove. However, it is to be understood that the invention is not limited to these specific embodiments. Thus, by way of example but ot of limitation, the base sheet may be provided with an opening in the area of the insert, and the opening would be slightly smaller than the insert, to assure good adhesion of the insert by adhesive around the periphery thereof. Further, it is noted that, while the invention is particularly useful for high speed copiers, the composite sheets may also be used in lower speed copiers, of course.

Concerning another matter, in some cases a single type of adhesive may be employed both as a first adhesive layer to secure the two sheets together, and as a second adhesive layer to hold the insert in place. Accordingly, the invention is not limited to the precise embodiments described in detail hereinabove. Also, with respect to the claims, it is applicants' intention that the claims not be interpreted in accordance with the sixth paragraph of 35 U.S.C. §112 unless the term "means" is used followed by a functional statement.

What is claimed is:

1. A multilayer sheet assembly with a removable insert for printing by a high speed printer, the multilayer sheet assembly comprising:

a base sheet;

a face sheet having a predetermined thickness, the face sheet having a window opening and being substantially coextensive with the base sheet, with said base sheet extending continuously over said window;

an insert of a different material from the face sheet, the insert having a thickness substantially equal to the predetermined thickness of the face sheet, and substantially filling the window opening of the face sheet;

a first adhesive layer having areas free of adhesive, the first adhesive layer discontinuously securing the face sheet to the base sheet, wherein the face sheet and the base sheet have the adhesive free areas to enhance lay-flat properties, said first layer of adhesive being in the form of spots of adhesive, and being spaced slightly back from edges of said sheet assembly;

a second adhesive layer removably securing the insert to the base sheet; and the multilayer sheet assembly having a substantially constant thickness of 15 mils or less, and being sufficiently flexible and uniform across its extent to reliably print at a high rate of speed of more than 50 sheets per minute by a printer or copier.

2. The multilayer sheet assembly according to claim 1, wherein the insert has an adhesive side.

3. The multilayer sheet assembly according to claim 2, including a thin release coating between the second adhesive layer and the insert.

4. A multilayer sheet assembly with a removable insert for printing by a high speed printer, the multilayer sheet assembly comprising:

a base sheet;

a face sheet having a predetermined thickness, the face sheet having a window opening, with said base sheet extending continuously over said window;

an insert of a different material from the face sheet, the insert having a thickness substantially equal to the predetermined thickness of the face sheet, and substantially filling the window opening of the face sheet;

a first layer of adhesive having a plurality of adhesive areas and a plurality of non-adhesive areas, the first layer of adhesive discontinuously securing the face sheet to the base sheet, wherein the face sheet and the base sheet are independent in the plurality of non-adhesive areas to enhance lay-flat properties, said first layer of adhesive being in the form of spots of adhesive, and being spaced slightly back from edges of said sheet assembly;

a second adhesive layer releaseably securing the insert to the base sheet; and the multilayer sheet assembly having substantially coplanar surfaces and being sufficiently flexible to reliably pass through a high speed printer or copier.

5. The assembly according to claim 4, wherein the plurality of adhesive areas of the first layer of adhesive has surface areas in the range of approximately 0.125 to 1.00 square inch.

6. The multilayer according to claim 4, wherein the plurality of adhesive areas of the first layer of adhesive are approximately 0.06 to 0.25 inch apart.

7. The multilayer sheet assembly according to claim 4, wherein the plurality of adhesive areas of the first layer of adhesive include areas with different sizes and shapes.

8. The assembly according to claim 4, wherein the plurality of adhesive areas of the first layer of adhesive include areas with substantially hexagon shapes.

9. The assembly according to claim 4, wherein the plurality of adhesive areas of the first layer of adhesive include areas with substantially diamond shapes.

10. The assembly according to claim 4, wherein the first layer of adhesive is a rubber base adhesive.

11. The assembly according to claim 4, wherein the second adhesive has a plurality of adhesive areas and a plurality of non-adhesive areas.

12. The assembly according to claim 4, wherein the second adhesive is a latex base adhesive.

13. The assembly according to claim 11, wherein the plurality of adhesive areas of the second adhesive has areas with substantially circular shapes.

14. The assembly according to claim 4, wherein the multilayer sheet assembly has a substantially constant thickness of 15 mils or less.

15. The assembly according to claim 4, wherein the insert defines a substantially rectangular shape.

16. The assembly according to claim 4, wherein the multilayer sheet assembly is a continuous multilayer assembly.

17. The assembly according to claim 4, wherein the insert includes a pressure sensitive adhesive film.

18. The assembly according to claim 17, including a thin release coating between the second adhesive layer and the insert.

19. A multilayer assembly with a removable insert comprising:

a base element;

a face element having a window opening, with said base sheet extending continuously over said window;

a first layer of adhesive having a plurality of adhesive areas, the first layer of adhesive discontinuously securing the face element to the base element, said first layer of adhesive being in the form of spots of adhesive, and being spaced slightly back from edges of said sheet assembly; and an insert within the window opening of the face element and releasably secured to the base element.

20. The assembly according to claim 19, wherein the insert is made of plastic material.

21. The assembly according to claim 19, wherein the insert is releasably secured to the base element with an adhesive having a peel force in the range of approximately 5 to 75 grams per square inch.

22. A multilayer sheet assembly with a removable insert for printing by a high speed printer, the multilayer sheet assembly comprising:

a base sheet;

a face sheet having a predetermined thickness, the face sheet having a window opening and being substantially coextensive with the base sheet;

an insert of a different material from the face sheet, the insert having a thickness substantially equal to the predetermined thickness of the face sheet, and substantially filling the window opening of the face sheet;

a first adhesive layer having areas free of adhesive, the first adhesive layer discontinuously securing the face sheet to the base sheet, wherein the face sheet and the base sheet have the adhesive free areas to enhance lay-flat properties;

a second adhesive layer removably securing the insert to the base sheet;

said second adhesive layer being pressure sensitive adhesive directly engaging said insert; and a layer of release material between said second adhesive and said base sheet; and the multilayer sheet assembly having a substantially constant thickness of 15 mils or less, and being sufficiently flexible and uniform across its extent to reliably print at a high rate of speed of more than 50 sheets per minute by a printer or copier.

23. An assembly as defined in claim 22 wherein said second adhesive layer extends across the center of the insert, said base sheet extends continuously across said window opening, and wherein said first layer of adhesive is spaced slightly back from the edges of said assembly.

24. An assembly as defined in claim 19 wherein said insert is directly coated with pressure sensitive adhesive to form a removable pressure sensitive coated label.

* * * * *